United States Patent
Alexander

(10) Patent No.: US 7,539,489 B1
(45) Date of Patent: *May 26, 2009

(54) LOCATION-BASED TESTING FOR WIRELESS DATA COMMUNICATION NETWORKS

(75) Inventor: Thomas Alexander, Mulino, OR (US)

(73) Assignee: Veriwave, Incorporated, Beaverton, OR (US)

( * ) Notice: Subject to any disclaimer, the term of this patent is extended or adjusted under 35 U.S.C. 154(b) by 1266 days.

This patent is subject to a terminal disclaimer.

(21) Appl. No.: 10/815,823

(22) Filed: Apr. 2, 2004

Related U.S. Application Data

(60) Provisional application No. 60/460,640, filed on Apr. 4, 2003.

(51) Int. Cl.
*H04Q 7/20* (2006.01)
(52) U.S. Cl. ............... 455/423; 455/67.11; 455/456.1; 455/424; 455/425; 370/241
(58) Field of Classification Search ......... 455/423–425, 455/432.1, 436, 456.1–457, 41.2, 550.1, 455/552.1, 562.1, 67.11; 370/328–350, 241–245
See application file for complete search history.

(56) References Cited

U.S. PATENT DOCUMENTS

| | | | | |
|---|---|---|---|---|
| 6,091,950 | A * | 7/2000 | Remy .......................... | 455/423 |
| 6,724,730 | B1 * | 4/2004 | Mlinarsky et al. ........... | 370/241 |
| 7,006,467 | B2 * | 2/2006 | Anton et al. ................. | 370/329 |
| 7,298,702 | B1 * | 11/2007 | Jones et al. .................. | 370/235 |
| 7,349,692 | B2 * | 3/2008 | Ko et al. ..................... | 455/423 |
| 2001/0016490 | A1 * | 8/2001 | Martin-Leon et al. ....... | 455/424 |
| 2002/0183054 | A1 * | 12/2002 | Rimoni et al. .............. | 455/423 |
| 2003/0100299 | A1 * | 5/2003 | Ko et al. ..................... | 455/423 |
| 2007/0178843 | A1 * | 8/2007 | Singh et al. ................. | 455/67.11 |
| 2008/0026748 | A1 * | 1/2008 | Alexander et al. .......... | 455/432.1 |

* cited by examiner

*Primary Examiner*—Kamran Afshar
(74) *Attorney, Agent, or Firm*—Dennis R. Haszko

(57) ABSTRACT

Apparatus and methods facilitating a distributed approach to performance and functionality testing of location-sensitive wireless data communication systems and equipment are described. A plurality of test units, geographically distributed at arbitrary points in a three-dimensional volume surround the system or equipment under test. Each test unit generates test stimuli and records responses from the device under test, and emulates the effects of changes in spatial location within an actual wireless network environment. A central controller co-ordinates the set of test units to ensure that they act as a logical whole, and enables testing to be performed in a repeatable manner in spite of the variations introduced by the location sensitive characteristics of wireless data communication networks. The central controller also maintains a user interface that provides a unified view of the complete test system, and a unified view of the behavior of the system or equipment under test. For diagnostic purposes, the recorded responses may be regenerated to view any defects as many times as necessary to correct them. Alternatively, each test unit may have either wired network interface units, instead of a wireless interface unit to test systems or equipment forming part of a wired network portion in the wireless data communication system.

56 Claims, 9 Drawing Sheets

LOCATION-BASED TESTING FOR WIRELESS DATA COMMUNICATION NETWORKS

RELATED APPLICATIONS

The present application claims the benefit of U.S. Provisional Patent Application Ser. No. 60/460,640 filed on Apr. 4, 2003.

FIELD OF THE INVENTION

The present invention relates to wireless data communication networks and, more specifically, to location-based testing for wireless data communication networks.

BACKGROUND TO THE INVENTION

Wireless Local Area Networks (WLANs) have recently gained in popularity and importance. These networks are a special case of standard computer Local Area Networks (LANs), where the wires or optical fibers interconnecting computers have been partially or completely replaced by radio frequency (RF) data links. WLANs may also be viewed as a special case of commonly encountered cellular telephone networks, where the relatively large distances in the order of tens of miles covered by cellular telephones have been significantly reduced to hundreds of feet, (within buildings) in exchange for much higher data transmission rates. WLANs offer the possibility of interconnecting information technology devices at relatively high speeds without wires, and hence yield significant reductions in installation cost together with significant improvements in user convenience.

The increased usage and reliance upon WLANs has in turn dictated an increase in the level of performance and functionality testing that must be carried out in order to ensure that the WLAN protocol has been properly implemented and that WLAN equipment will function predictably, reliably and robustly under all circumstances. Without a significant level of testing, it is not possible to guarantee this reliability and performance.

In general, WLAN testing and characterization seeks to achieve the same goals as traditional wired LAN testing. The following categories of tests must be carried out:

(a) Performance measurements. These tests seek to determine some metrics of network performance, such as data rate (typically measured in bits per second), bit or frame error ratios, system utilization, latency, burst tolerance, etc. Performance measurements are normally carried out by transmitting test stimulus data at various speeds to the device under test and making quantitative measurements on the response from the device.

(b) Conformance tests. These tests attempt to quantify the level of adherence of the device to a set of specifications or requirements. These specifications may include published standards (e.g., the IEEE 802.11 standard for WLANs). They are usually carried out by presenting a set of well-defined patterns or stimuli to the device under test and verifying that the device responds as per the specification to each set of stimuli.

(c) Interoperability tests. These tests are used to ensure that two or more devices from different sources can intercommunicate without problems. Interoperability tests can be done by utilizing test equipment to simulate or emulate devices with which interoperability is desired, and measuring the responses of the device under test to ensure that the expected values are matched.

(d) Diagnostic tests. Diagnostic tests are performed during design and development to expose any faults or design errors in the device that may be causing performance, conformance or interoperability tests to fail. These are typically performed with the same test equipment, but set up instead to generate arbitrary stimuli to the device under test and record its responses.

Unlike wired LANs, however, WLANs have created a number of significant problems related to performance and functionality testing and characterization. The complexity of the protocol required to implement the high-speed data transfers is quite high, requiring correspondingly more complex and detailed testing capability. A single piece of WLAN equipment may need to communicate with multiple computers or end-stations, all sharing the same spectrum and in close proximity to each other. This renders the interactions observed between the equipment and the end-stations more complex and less predictable. The attenuation and multipath characteristics of the RF channel used to communicate between the WLAN equipment and the end-stations can cause significant variations in behavior and performance. Interference can also occur between WLAN equipment located in the same or adjacent buildings, even though they are physically isolated. All of these render the WLANs testing many times more complex than the testing for traditional wired or fiber-optic LANs.

Implementation and testing of WLAN networks, equipment and components is hence very different from that of standard wired LANs such as Ethernet. An important difference is that location is a significant parameter within the test environment; changing the location of equipment has virtually no impact on a wired LAN, but creates a huge impact on a WLAN system. Therefore, wired LAN testing methods and test equipment are quite unsuitable for WLAN testing, and a substantially new approach is required. This new approach, and the apparatus required to realize it, are the subjects of the present invention.

The key factor that distinguishes protocol testing of wireless data communication networks such as WLANs from that of wired LANs is the concept of location aware protocol testing. Location awareness here refers to the fact that the exact three-dimensional spatial location of a WLAN device, relative to the other WLAN devices and to the environment in which it is placed, is of great significance in the performance and functioning of the WLAN and must be accounted for. For example, shifting the position of a WLAN device by a few feet (e.g., placing it in a different room) can materially affect the throughput or interference seen by the device. This is clearly not the case for wired LAN technologies, which operate using copper or fiber optic links that are substantially insensitive to changes in physical location. This means that WLAN test systems must support the ability to account for the three-dimensional spatial location of the device or system being tested. In addition, the tests performed upon a device or system at a particular location cannot be reproduced at a different location without also duplicating some or all of the characteristics of the original location. Such duplication may be performed either directly (i.e., re-creating the physical environment of the device or system) or indirectly (i.e., by simulating the characteristics of the physical environment, without duplicating it in its entirety). The latter is clearly much simpler.

SUMMARY OF THE INVENTION

It is an object of the invention to provide an improved wireless data communication protocol tester. It is a further object of the invention to provide a wireless data communication protocol tester that enables the location-dependent characteristics of wireless data communication networks to be accounted for during protocol testing.

It is yet a further object of the invention to provide a wireless data communication protocol tester that enables the location-dependent characteristics of a wireless data communication network environment to be simulated at a different location without reproducing the entire physical environment.

In a first aspect, the present invention provides a test unit for testing operation and measuring performance of wireless data communication systems and equipment, comprising: a protocol test unit for generating test stimulus data, executing a sequence of test steps selected for testing operation and measuring performance of said wireless data communication systems, and processing test result data; a location processor, operatively coupled to said protocol test unit, for generating spatial location data providing the location of said protocol test unit relative to a preset point; and a first interface unit, operatively coupled to said protocol test unit, for converting said test stimulus data to a first format specific to said object under test and for converting said test result data to a second format specific to said protocol test unit.

In a second aspect, the present invention provides a test system for testing operation and measuring performance of wireless data communication systems and equipment, comprising: n test units, each test unit for selectively testing a specific parameter and data protocol pertinent to an object under test, where n is an integer n∈[1, N]; a location processor on each said test units for determining the location of each said test unit relative to a pre-set point; a central controller for monitoring, controlling and coordinating operation of said test units and collecting test results data associated with said respective spatial location data; and a user interface for enabling selection of test sequences, configuration of traffic generation and of test parameters.

In a third aspect, the present invention provides a method of testing operation and measuring performance of wireless data communication systems and equipment, comprising: a) providing n test units in the proximity of an object under test and connecting said test units to a central controller, where n in an integer n∈[1, N]; b) initializing a connection between said test units and said central controller; c) configuring at each said test unit traffic generation, a test sequence, and a set of reporting parameters according to said test sequence; d) operatively controlling said test units for executing said test sequence; e) collecting test result data at said test units and associating said test result data with a respective test unit; and f) organizing, reviewing and analyzing said test result data.

In a fourth aspect, the present invention provides a test system for testing operation and measuring performance of wireless data communication systems having both a wireless network portion and a wired network portion, comprising: n test units, each test unit for selectively testing a specific parameter and data protocol pertinent to an object under test in said wireless data communication systems, where n is an integer n∈[1, N]; a location processor on each said test units for determining the location of each said test unit relative to a pre-set point; a central controller for monitoring, controlling and coordinating operation of said test units and collecting test results data associated with said respective spatial location data; and a user interface for enabling selection of test sequences, configuration of traffic generation and of test parameters; wherein at least one of said n test units includes a wireless network interface unit for testing a wireless object in said wireless network portion, and wherein at least one of said n test units includes a wired network interface unit for testing a wired object in said wireless network portion.

Advantageously, the test units may be responsive to high-level instructions for performing protocol tests or sequences of protocol tests from the central controller, and process these high-level instructions in order to generate data bit patterns, analysis functions and control functions that are required by the protocol generation and processing means.

BRIEF DESCRIPTION OF THE DRAWINGS

The description of the preferred embodiments is taken in conjunction with the accompanying drawings, wherein.

DESCRIPTION OF THE PREFERRED EMBODIMENTS

Figure 1:
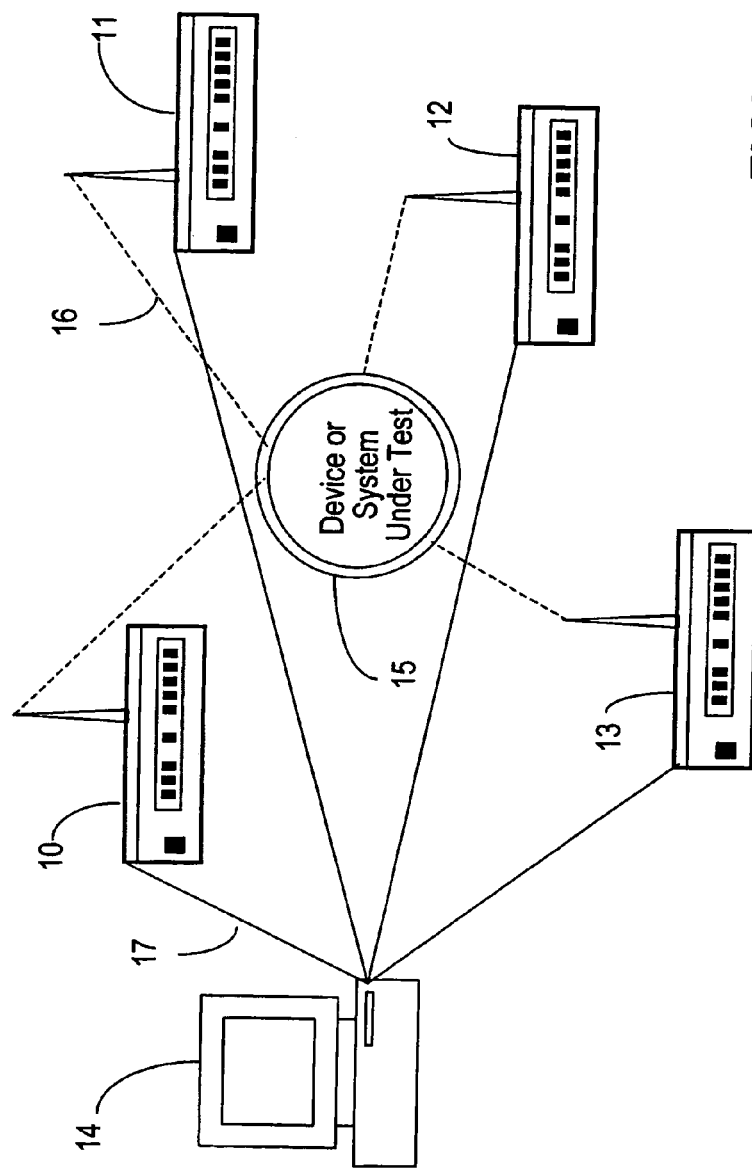
FIG. 1 is a diagram illustrating a general arrangement of the test units and the central controller in relation to the device or system under test.

With reference to FIG. 1, the wireless data communication protocol test system comprises a general-purpose computer 14 that is programmed to act as a central controller, and a plurality of identical test units 10, 11, 12, 13 that perform the actual traffic generation and reception functions during the process of protocol testing of device or system under test 15. Term "object under test" is also used for item 15, to collectively designate a device or a system under test. As all of the test units 10, 11, 12, 13 are preferably identical, it is understood that a reference to an aspect of any specific test unit, e.g. 10, shall be hereinafter taken to apply to all of the other test units in the system, e.g., 11, 12, 13. It is further understood that the number of test units 10 in the system may range from 1 to any arbitrary number required to perform a specific test or to simulate a specific wireless data communications network.

The central controller 14 communicates with each test unit as shown at 17. Each test unit 10 is a compact device that can be placed at various locations around or within the device or system under test 15 and generates and receives wireless data streams 16 to and from the latter. Each test unit 10 may be programmed to simulate a WLAN access point (AP), a WLAN endstation (STA), or both, or may be set up to simply monitor traffic being generated or received by the device or system under test 15.

Figure 6:
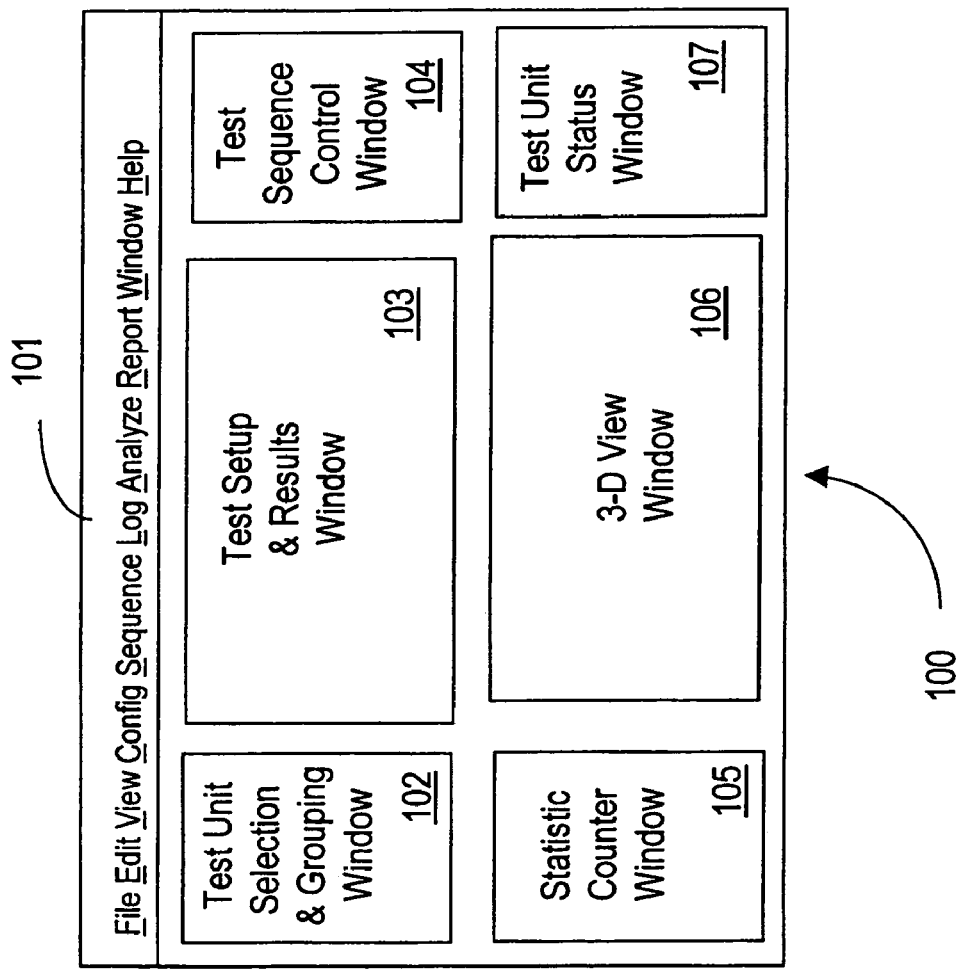
FIG. 6 is a representation of the user interface implemented by the central controller.

The central controller 14 preferably utilizes a standard host computer or workstation, such as a personal computer, and executes user-interface and control software. A comprehensive control and analysis program is implemented on the central controller 14 in order to control and co-ordinate the test units. User control of the test units is accomplished through a Graphical User Interface (GUI). An example of a GUI window 100 is shown in FIG. 6, and described in detail in the accompanying text. In general, GUI 100 provides the user with access to analysis tools (filters, statistics calculation, charting etc.) as well as provides the ability to format and output analysis reports, and communicate with the test units 10, 11, 12, 13 via UHF or Ethernet communication means 17.

Figure 2:
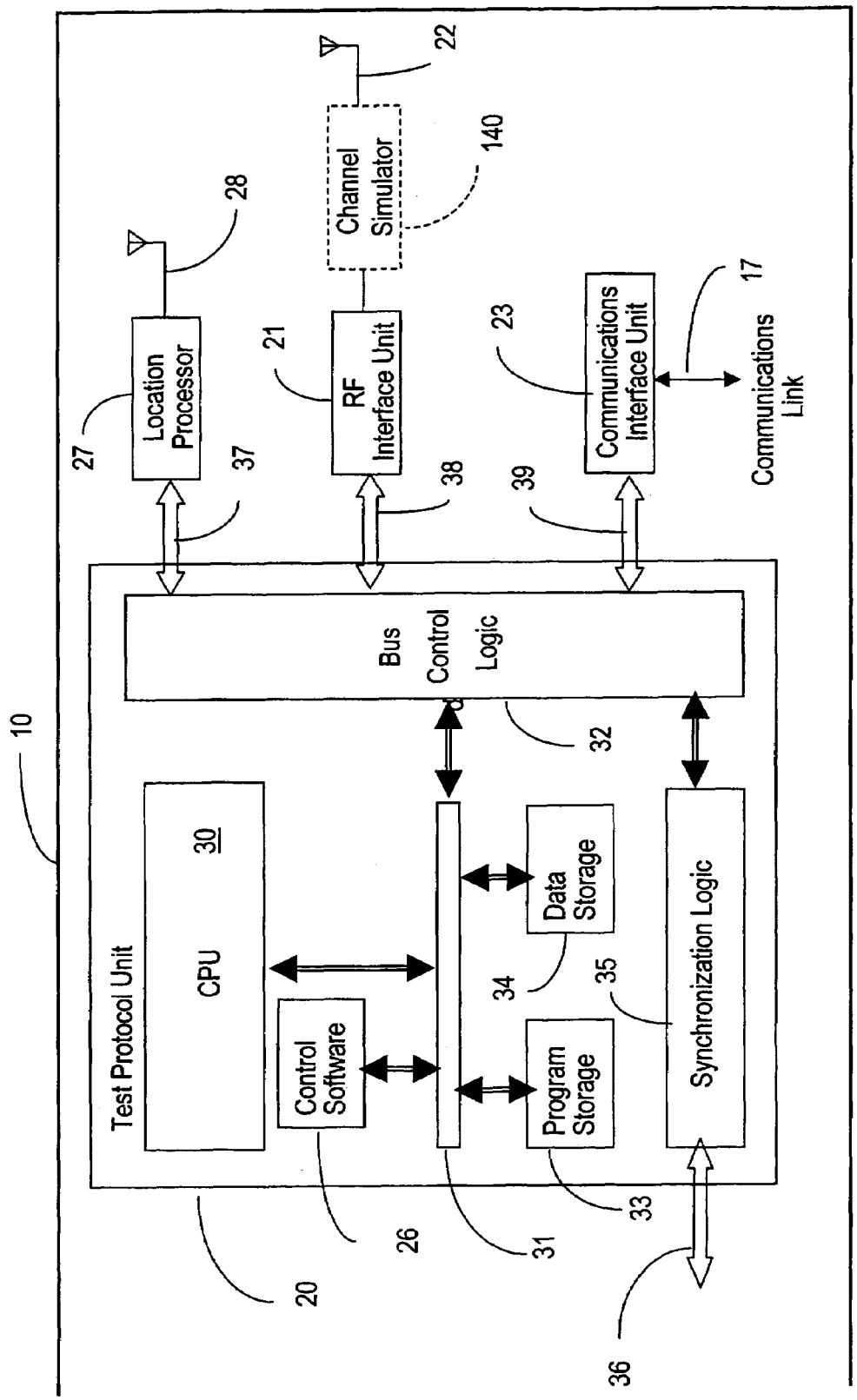
FIG. 2 is a schematic block diagram showing the details of a single test unit.

With reference to FIG. 2, each test unit 10 preferably comprises a protocol test generation and processing unit 20, an RF interface unit 21 coupled to antenna 22, either directly or indirectly, that generates and receives wireless data streams to and from the device or system being tested; a communications interface unit 23 coupled to communications link 17 that serves to communicate with the central controller 14, and a location processor 27, coupled to location processor antenna 28. Test generation and processing unit 20 executes the test unit control software 26 and includes a storage 25 for tests and test results. Location processor 27 calculates the spatial location of the test unit 10 in three dimensions relative to the central controller 14 in order to determine the position of the test unit 10 within the environment surrounding the device or system under test 15.

The location processor 27, RF interface unit 21, and communications interface unit 23 are operatively coupled to protocol test generation and processing unit 20, and are preferably implemented as plug-in cards to allow simple upgrading, either during manufacturing or in the field. For instance, future support for newer WLAN protocols may be accomplished by inserting a different RF interface unit 21.

The protocol test generation and processing unit 20 is preferably constructed around a high-speed embedded CPU 30 and associated peripherals that are operatively coupled to CPU bus 31. The CPU 30 is interfaced to program storage 33 and data storage 34. Program storage 33 may be implemented using Flash Electrically Erasable Programmable Read-only Memory (Flash EEPROM), while data storage 34 may advantageously be implemented using Synchronous Dynamic RAM (SDRAM) for maximum speed and data capacity. At least 32 megabytes of Flash EEPROM, plus at least 64 MB of SDRAM, may be implemented.

The CPU 30 is also interfaced to bus control logic 32 that is operatively coupled to synchronization logic 35 as well as to interfaces 37, 38 and 39. Location interface 37 couples to location processor 27; RF interface 38 couples to RF interface unit 21; and communication interface 39 couples to communications interface unit 23. The CPU utilizes bus control logic 32 to implement the control and data transfer functions required to support location processor 27, RF interface unit 21 and communications interface unit 23.

The CPU 30 exercises overall control and co-ordination of location processor 27 and RF interface unit 21, maintains the communication link 17 to central controller 14 via communications interface unit 23 (preferably supporting a TCP/IP protocol stack in order to simplify the communications functions), and communicates with the central controller 14 to perform test set-up and report test results. The CPU 30 may also implement firmware programs required for performing the protocol testing and analysis functions.

Synchronization logic 35 is operative to provide a clock reference frequency for use by RF interface unit 21 in generating wireless data bit streams of the proper data rate and phase alignment. It is coupled to synchronization inputs and outputs 36, which may be advantageously connected to the corresponding synchronization inputs and outputs 36 of other test points in order to align all the data bit streams produced by these test points. In addition, synchronization logic 35 provides the timing reference required to mark the times at which wireless data bit streams have been received by RF interface unit 21. Synchronization logic 35 is preferably implemented using a temperature-compensated high-stability Voltage Controlled Crystal Oscillator (VCXO), implemented as part of a Phase Locked Loop (PLL), that generates a stable and precise 10 MHz clock reference locked to a 100 pulse-per-second (PPS) signal that is either generated internally or received from another test unit via synchronization inputs and outputs 36.

Figure 3:
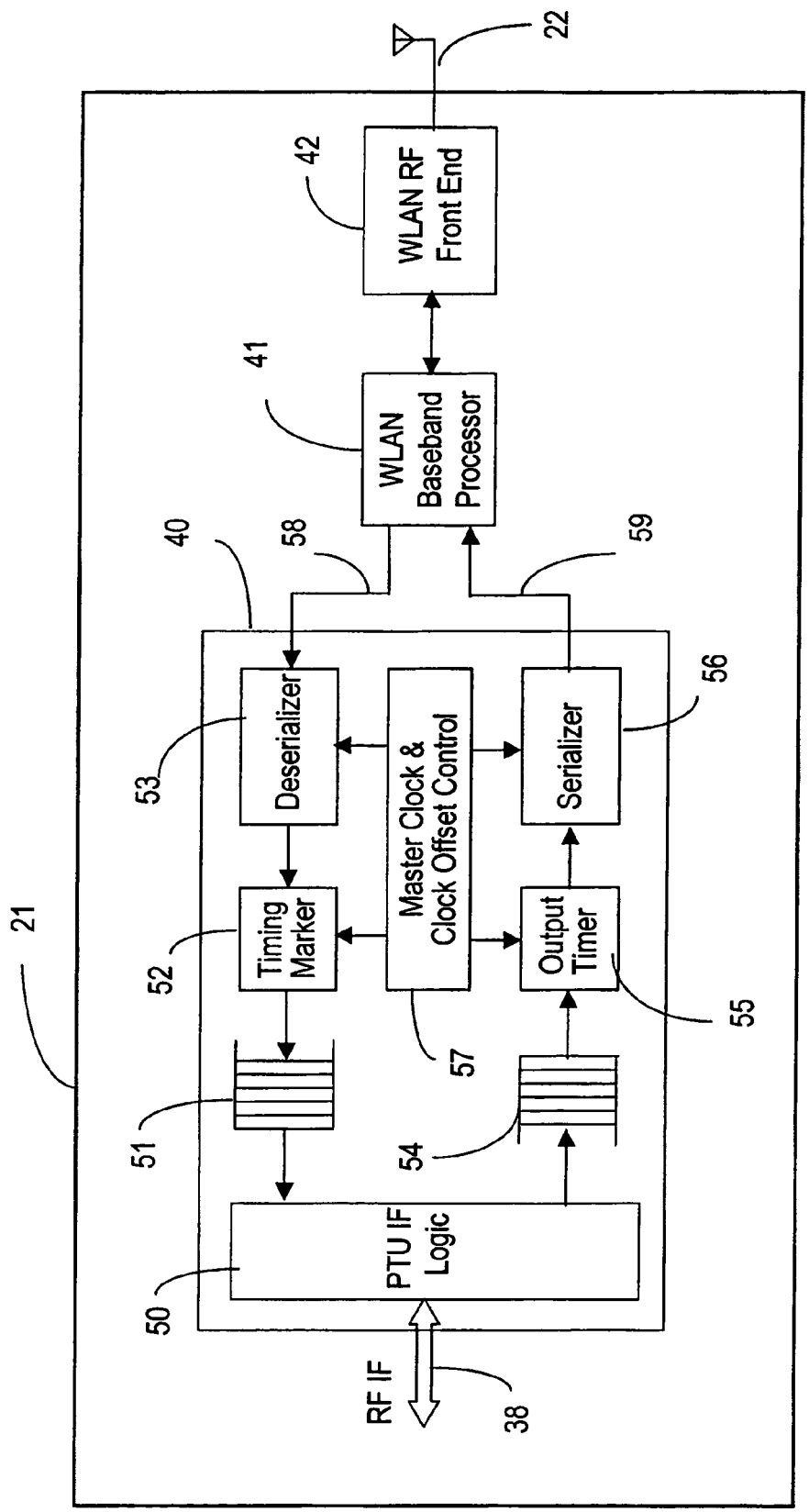
FIG. 3 is a schematic block diagram of the RF interface unit circuitry.

With reference to FIG. 3, RF interface unit 21 comprises a WLAN RF front-end unit 42, a WLAN baseband processor unit 41, and protocol pre-processing logic 40.

WLAN RF front-end unit 42 is operative to implement the radio frequency amplification, frequency conversion, and analog signal processing functions such as Automatic Gain Control (AGC), as required by the physical layer of the wireless data communication protocol. Further, WLAN RF front-end unit 42 implements attenuation functions such that the RF signal output by RF interface unit 21 to antenna 22 may be controlled to a high degree of precision, and the detection threshold for the RF signal input to RF interface unit 21 by antenna 22 may also be controlled to a high degree of precision. These attenuation functions permit the RF interface unit 21 to simulate the effect of increased attenuation of radio signals through the environment, as would be found, for example, if the test unit 10 and the device under test 15 were separated by a greater distance. Also, antenna 22 coupled to WLAN RF front-end circuitry 42 may advantageously be replaced with a connectorized coaxial cable in situations requiring direct connection from test unit 10 to device under test 15, as for example when device under test 15 is to be tested as a closed system and not as part of a larger environment, or for example when it is desired to exclude external signal interference from various sources.

WLAN baseband processor 41 is operative to perform the signal modulation and demodulation functions required by the physical layer of the wireless data communication protocol. These functions may advantageously be implemented using digital signal processing circuitry.

Protocol pre-processing logic 40 provides hardware acceleration functions to assist protocol test generation and processing unit 20, of FIG. 2, in carrying out the required protocol tests. In addition, it may contain the timing logic necessary for the precise bit-level timing requirements of WLAN baseband processor 41, and may further implement a serial control interface to support the configuration and monitoring of WLAN baseband processor 41 and WLAN RF front-end 42.

In one embodiment, protocol pre-processing logic 40 may include on the receive side a deserializer (serial to parallel converter) 53, a timing marker 52, a receive First In First Out (FIFO) buffer 51, and a protocol processor interface logic 50. On the transmit side, protocol pre-processing logic 40 may include a transmit FIFO buffer 54, an output timer logic 55, and a serializer (parallel to serial converter) 56. The clocking and synchronization of the protocol pre-processing logic 40 is controlled by a master clock logic and clock offset control logic 57. The logic interfaces with the WLAN baseband processor 41 via baseband receive input 58 and baseband transmit output 59, both of which convey serial data.

Deserializer 53 converts the incoming serial data stream demodulated by the baseband processor 41 into a parallel data stream of preferably 8 bits in width. This data stream is passed to timing marker logic 52, which detects the start and end of the data stream constituting each received frame and timestamps the start and end points with an accurate time indication derived from master clock logic 57. The time-stamped data stream is then placed in receive FIFO 51, and subsequently passed to the protocol test generation and processing logic 20 by protocol processor interface logic 50 through RF interface bus 38.

Transmit data, preferably in 8-bit byte format, are obtained from the protocol test generation and processing logic 20, of FIG. 2, by protocol processor interface logic 50 via RF interface bus 38 and placed into transmit FIFO 54. The data are then passed to output timer logic 55, which controls the precise time at which each word of transmit data will be passed to serializer 56. Timing references are provided by master clock logic 57 to output timer logic 55. The parallel data presented to serializer 56 are then converted to serial form and placed on baseband transmit output 59 for later modulation and transmission by WLAN baseband processor 41.

The master clock logic 57 is responsible for generating the clock signals required by the receive and transmit paths of protocol pre-processing logic 40. These clock references are phase-locked to the accurate clock reference generated by synchronization logic 35. In addition, master clock logic 57 is capable of adding or subtracting an adjustable offset delay to the clock reference obtained from synchronization logic 35 prior to creating the actual receive and transmit clock signals. This enables the protocol pre-processing logic 40 to simulate the effect of propagation delays through the environment. For instance, an increased offset delay is equivalent to the effect of increasing the distance between the test unit 10 and the device or system under test 15.

It is understood that different air interface standards (IEEE 802.11 Wireless LAN, Bluetooth, HiperLAN, etc.) may be accommodated by substituting the appropriate baseband processing function 41 and RF front-end function 42 in RF interface 21. It will be apparent to persons skilled in the art that the protocol test generation and processing unit 20 is realized in a general fashion using firmware running on CPU 30, and hence support of wireless data communications protocols is simply a matter of replacing RF interface 21 and reprogramming the firmware.

Figure 4:
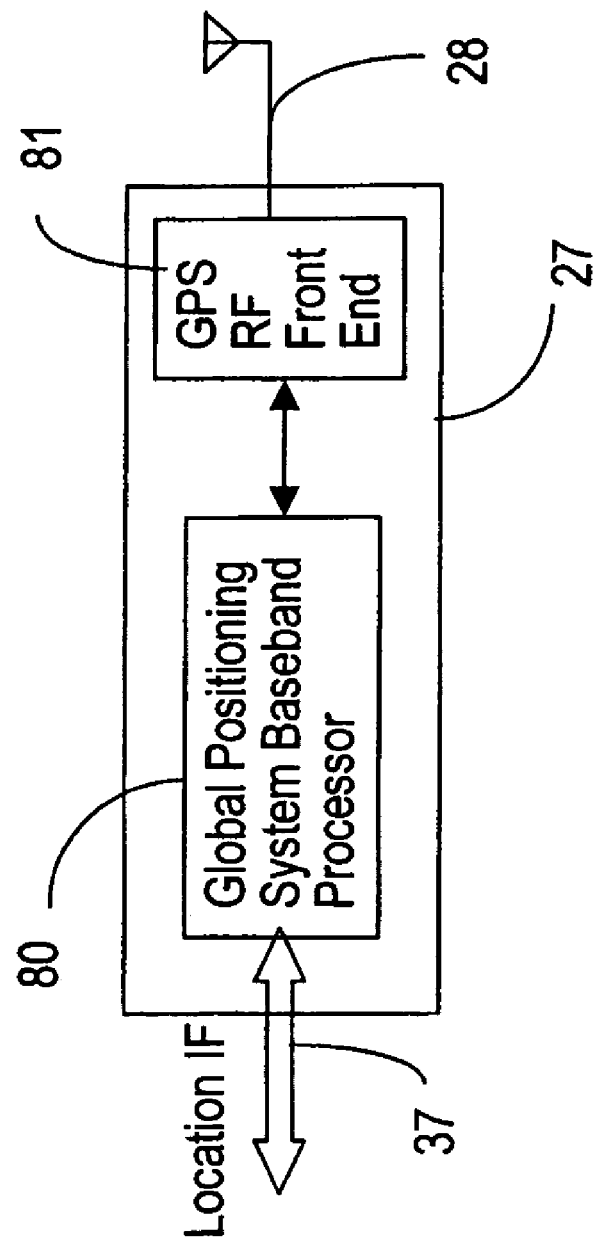
FIG. 4 is a schematic block diagram of the circuitry for the location determining means.

With reference to FIG. 4, location processor 27 may be advantageously implemented using the Global Positioning System (GPS) to determine the absolute three-dimensional spatial co-ordinates of test unit 10, and subsequently computing the three-dimensional vector from the test unit 10 to the central controller 14 in order to ascertain the relative position of test unit 10. The location processor 27 consists of GPS RF front end unit 81, operatively coupled to location processor antenna 28, and GPS baseband processor 80. Standard GPS processing is performed on the GPS satellite navigation signals received by location processor antenna 28 to compute the three-dimensional co-ordinates of test unit 10, and these co-ordinates are passed to protocol test generation and processing logic 20 by means of location interface 37.

A communications link is required between the test unit 10 and the central controller 14 in order for the central controller 14, of FIG. 1, to configure and control test unit 10 and also to receive test results. This communications link may preferably be implemented using either Ethernet or a dedicated UHF radio link. The communications link is supported by implementing one instance of communications interface unit 23 in each test unit 10, and one similar instance of communications interface unit 23 in the central controller 14. If Ethernet is being used, a standard Ethernet repeater or switch (not shown) may preferably be used to permit all of the test units 10, 11, 12, 13 to communicate with the central controller 14. If a UHF radio link is being used, the central controller 14 may advantageously implement a polling or time-division-multiplexing protocol to allow communications with all of test units 10, 11, 12, 13 without requiring multiple instances of communications interface unit 23 to be present at the central controller 14. The realization of such polling or time-division-multiplexing protocols in radio links is well understood and will not be described further.

Figure 5A:
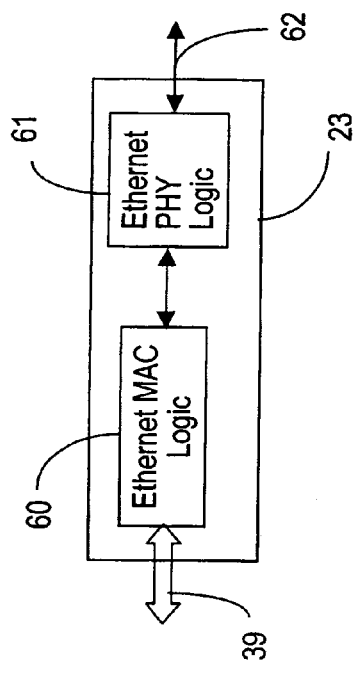
FIG. 5A is a schematic block diagram of the circuitry for the Ethernet LAN interface that may be used to implement the communication means with the central controller.

With reference to FIG. 5A, communications interface unit 23 may be implemented using the standard Ethernet communications protocol. In this case, Ethernet MAC logic 60 performs the required Ethernet packet processing and medium access control functions, and Ethernet Physical Layer Device (PHY) logic 61 implements the Ethernet physical layer functions required to interface to Ethernet link 62, which in turn is used to communicate with central controller 14. Ethernet MAC logic 60 is operatively coupled to protocol test generation and processing logic 20, of FIG. 2, by means of communications interface 39.

Figure 5B:
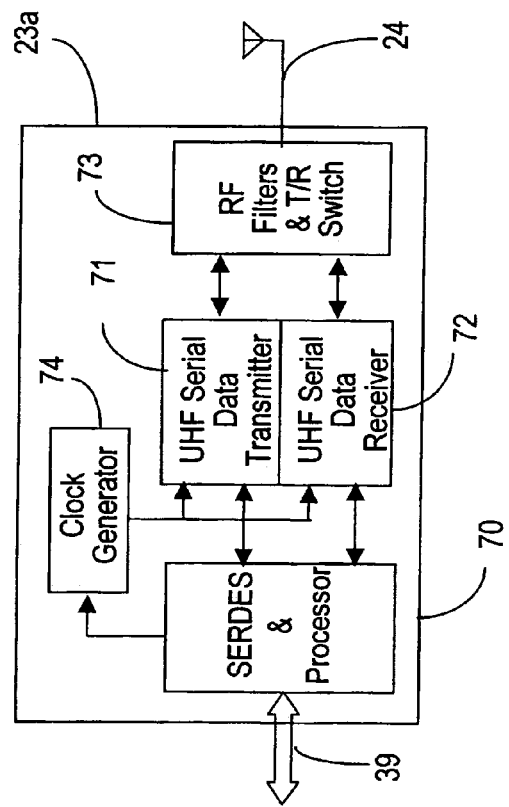
FIG. 5B is a schematic block diagram of the circuitry for the UHF radio data link that may be used to implement the communication means with the central controller.

With reference to FIG. 5B, communications interface unit 23a is an alternative implementation using a dedicated UHF radio data link operating in a suitable frequency band, preferably 430 MHz. The dedicated UHF radio data link comprises UHF antenna 75 coupled to RF filters and transmit/receive switch 73, which is in turn coupled to UHF serial data transmitter 71 and UHF serial data receiver 72. Serializer/deserializer (SERDES) and data processor 70 converts between parallel data transferred to or from the protocol test generation and processing logic 20 via communications interface 39 and serial data streams that are generated by UHF serial data receiver 72 and accepted by UHF serial data transmitter 71. Clock generator 74 implements a clock synthesis function that generates the necessary bit-clock, carrier and frequency conversion signals required by the UHF serial data transmitter 71 and UHF serial data receiver 72. Multiple UHF channels may be supported by reconfiguring clock generator 74 to generate different carrier frequencies.

With reference to FIG. 6, the software program executed by central controller 14 displays and maintains a Graphical User Interface (GUI) 100 that interacts with the user of the protocol test system and controls the operation of test units 10 through communication links 17, together with an underlying control program supporting GUI 100. The specific capabilities of GUI 100 and underlying control program preferably include:

(a) Detection, checking, initialization and configuration of the test units in the system;
(b) Display of test unit status;
(c) Grouping of test units under user command to simulate Basic Service Sets in the WLAN protocol;
(d) Configuration of traffic generation parameters;
(e) Display and editing of test control sequences;
(f) Configuration of traffic monitoring and capture filters;
(g) Display of traffic counters, and support of a traffic counter spreadsheet;
(h) Display of test unit location in a 3-D window;
(i) Display of captured frame data;
(j) Saving, restoring and execution of test control sequences;
(k) Display of measured traffic characteristics in charts and histograms;

(l) Saving and restoring of frame, counter and chart/histogram log files;

(m) Download and update of firmware on the test units; and (n) Inter-test unit synchronization during startup.

GUI 100 and associated control program may advantageously enable the user to download firmware images stored on the central controller to the test units 10, 11, 12, 13, thereby allowing the test units to be upgraded in capabilities and features in the field.

GUI 100 display preferably includes a menu bar 101 that displays menus of commonly used commands, a test unit selection and grouping window 102, a test setup and results window 103, a test sequence control window 104, a statistics counter window 105, a 3-D view window 106 and a test unit status window 107.

Test unit selection and grouping window 102 shows the plurality of test units 10 available to the user for the test, and permits the user to select and group these test units in any arbitrary combination in order to perform test setup and execution. Test setup and results window 103 enables the user to set up test units and monitor their results, either singly or in groups. Test sequence control window 104 allows the user to define and execute sequences of protocol test actions on one or more test units, and to organize these sequences in a hierarchical manner so as to construct complex test sequences from blocks of simpler test sequences. Statistics counter window 105 displays the statistics (packets or bytes transmitted and received, errors, histograms of packet lengths, etc.) accumulated by test units, either singly or in groups. The 3-D view window 106 displays a three-dimensional view (as a 2-D projection) of the set of test units and the device under test, using the spatial location information gathered from the test points. Finally, test unit status window 107 displays the status of individual test units that are selected via test unit selection and grouping window 102 or via 3-D view window 106.

User interactions with GUI 100 are translated by the underlying control program into sets of instructions that are transferred to test units 10 via communications links 17. Each set of instructions is executed by CPU 30 in the corresponding test unit 10 in order to perform a specific protocol test or tests. The results are returned to GUI 100 via communications links 17 and subsequently displayed in one or more of the windows of GUI 100.

Figure 7:
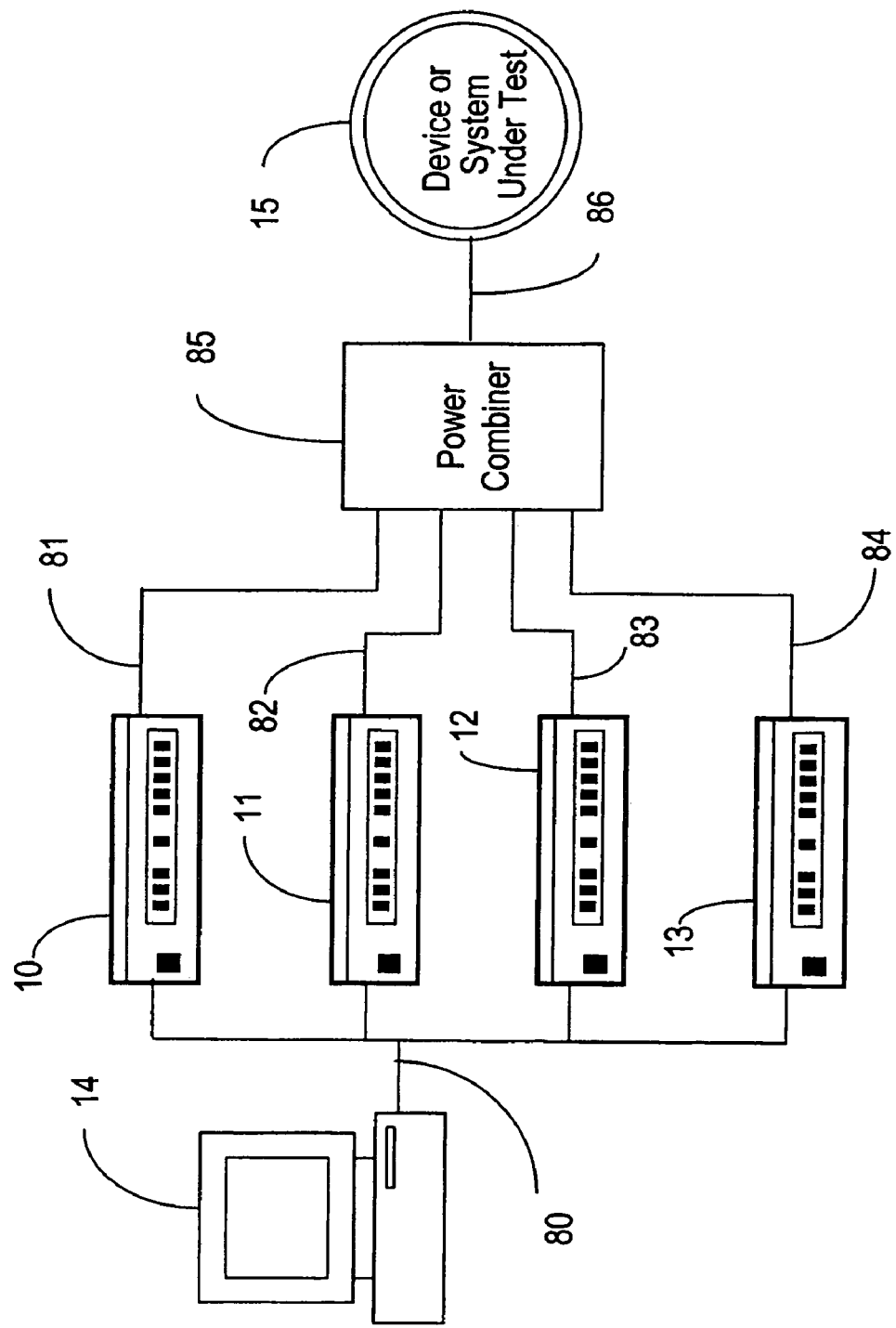
FIG. 7 is a diagram illustrating an arrangement of test units and the central controller wherein the air interfaces between the test units and a device under test have been replaced by cables.

With reference to FIG. 7, test units 10, 11, 12, 13 may advantageously support an auxiliary arrangement whereby microwave-rated cables 81, 82, 83, 84 are used instead of an air interface (i.e., without utilizing antennas) to carry signals between the test units 10, 11, 12, 13 and a device under test 15. This arrangement makes use of a standard passive microwave power splitter/combiner module 85 to combine the signals from multiple test units 10, 11, 12, 13 and drive them to the device under test 15 via cable 86, as well as to split the signals from the device under test 15 equally among the test units 10, 11, 12, 13. This type of cabled setup is only feasible if the device under test 15 supports connectorized antenna inputs (e.g., an auxiliary RF input, or removable antennas with standard connectors) or if device under test 15 can be placed in an RF-shielded chamber to which cables 81, 82, 83, 84 are coupled. When cabled in this manner, synchronization between test units 10, 11, 12, 13 is preferably accomplished by means of cables running directly between the synchronization inputs and outputs 36 coupled to synchronization logic 35 implemented in each test unit. A mechanical mounting in the form of a chassis or rack may advantageously be provided to further facilitate convenient operation of test units 10, 11, 12, 13 using cabled setups.

Operation of the wireless data communication protocol test system depicted in FIG. 1 is completely initiated and controlled via GUI 100 running on the host computer serving as central controller 14. GUI 100 converts operator commands that are input via a keyboard and mouse into high-level command messages directed at one or more of the test units 10, 11, 12, 13; these command messages are then passed to the specified test units via the appropriate communications links 17 (i.e., Ethernet or UHF radio). System operation preferably begins with an initialization phase, followed by the actual test configuration and execution phase. Post-processing and report generation may then follow the test phase, after tests have been executed and results gathered by GUI 100 from the test units.

Figures 8, 9:
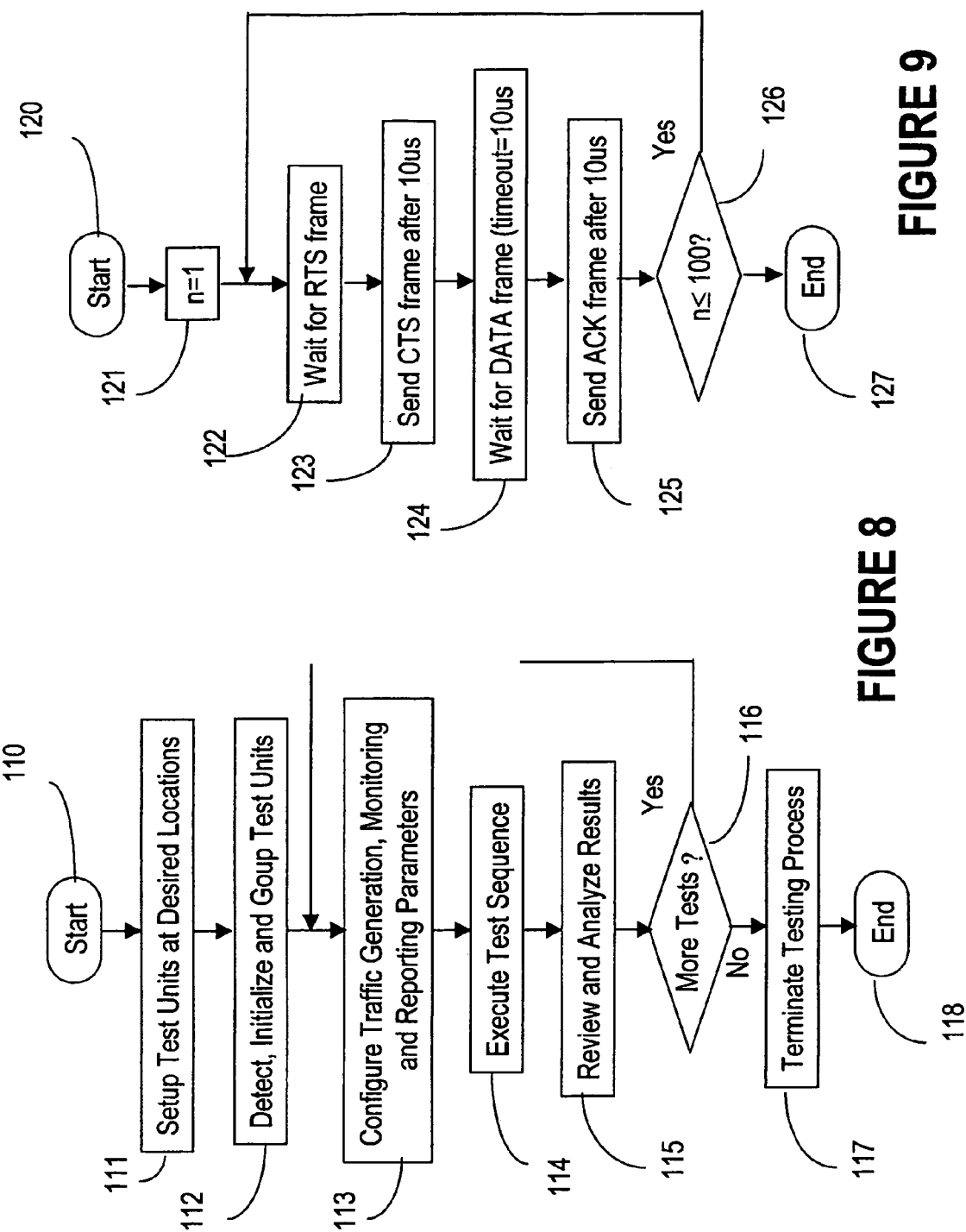
FIG. 8 depicts the process of setting up, initializing, configuring and operating the test units and analyzing the results.
FIG. 9 depicts an example of a sequence of instructions executed by a test unit when carrying out a specific protocol test.

With reference to FIG. 8, a typical usage scenario may include the steps of:

(a) At step 111, setting up the test units 10, 11, 12, 13 at the desired locations around the device or system under test 15 and powering them on.

(b) At step 112, starting up GUI 100 on the central controller 14 to display the top-level screen, verifying that the required test units 10, 11, 12, 13 have been detected and initialized, and then optionally grouping them into logical groups as desired using the test unit selection and grouping window 102 of GUI 100.

(c) At step 113, configuring parameters, if necessary, for the traffic generation to be performed by the groups of test units, and then setting up sequences of traffic to be generated by each test unit, using test setup and results window 103. The user may also optionally set up capture and monitoring filters controlling the data capture by each test unit using the same window.

(d) At step 114, executing the sequence(s) on the test units that have been selected to participate in the test, using test sequence control window 104.

(e) At step 115, reviewing the data captured by the test units and presented on statistics counter window 105, test unit status window 107, and test setup and results window 103, in order to ascertain whether the device or system under test 15 is functioning properly, whether additional tests need to be run, and, further, optionally invoking post-processing analysis and report generation functions on the captured data.

(f) At step 116, checking to see if more tests need to be run; if not, at step 117 terminating the test procedure by exiting GUI 100 and powering down the test units.

Initialization of the wireless data communication protocol test system at step 112 takes place immediately after GUI 100 is started, may include three stages: test unit polling and discovery, timing synchronization, and test unit location. The system initialization process preferably happens automatically (when the GUI 100 is started); however, it may also be initiated and controlled by the user via the GUI 100. Also, the initialization phase may advantageously include firmware upgrades to the test units 10, 11, 12, 13 under user control.

The first stage in the initialization process preferably includes polling for and discovering all of the test units that are available. The set of test units thus found is reported to the user, who may then be allowed to modify the set by removing or reassigning test units that are not intended to participate in the subsequent tests. The process of polling for test units may advantageously occur at regular intervals while GUI 100 is running, in order to detect when new test units have been added to the system, or if an existing test unit has been removed or has failed during a test.

The initialization process preferably then ensures that the internal real-time clock within each of the test units 10, 11, 12, 13 are synchronized. This is done with the aid of synchronization logic 35 that is implemented as a part of protocol test generation and processing unit 20, of FIG. 2. Synchronization inputs and outputs 36 coupled to synchronization logic 35 in each test unit are used to exchange timing signals between the test units in order to bring the clock references generated by master clock 57, of FIG. 3, of all of the test units into synchronism. After synchronization has been performed, the final stage of initialization preferably includes obtaining the precise three-dimensional location of each of the test units by means of location processor 27. Central controller 14 may poll for the three-dimensional coordinates of each test unit 10, and report the results to the user via test unit status window 107. The central controller 14 may advantageously improve location accuracy by transmitting differential GPS (DGPS) corrections to the test units 10, 11, 12, 13, at this time, if DGPS information is available.

Subsequent to initialization 112, each test unit 10 is preferably configured from central controller 14 prior to running tests, as shown in step 113. Configuration may include the steps of setting up RF interface unit 21 to match the test requirements, configuring traffic patterns and monitoring parameters to be used during the tests by protocol test generation and processing unit 20, and defining reporting options for test results to be sent back to central controller 14.

Configuration of RF interface unit 21, of FIG. 3, is relatively straightforward and may include writing parameters to its internal registers. The parameters to be written preferably cover such aspects as data rate, preamble length, scrambler seeds, antenna selection controls, tone generation, receiver AGC control, and transmitter power level. All of these parameters may be advantageously adjustable by the user via GUI 100.

Traffic patterns and monitoring configuration at step 113 comprises at least two aspects: traffic monitoring configuration and traffic generation configuration. Traffic monitoring configuration parameters set up each test unit 10 to gather traffic streams and characteristics, and may include error filters, frame capture filters, event filters (e.g., inter-frame spacing thresholds) and counter update controls. Traffic generation configuration parameters may be used to determine the nature of traffic (frames or interference) that will be transmitted by the test units, and preferably include frame data values, data payload patterns, error injection parameters, traffic stream parameters (e.g., inter-frame spacing, burst lengths, etc.) and test sequence scripts.

Reporting configuration parameters may be advantageously specified during step 113 in order to reduce the amount of data that has to be returned to the central controller 14 when test results are downloaded from the test units 10, 11, 12, 13. These configuration parameters may control the counters that maintain traffic statistics, as well as the types of frames that may be captured and reported during the test, plus the fields within captured frames that are actually stored. Reporting configuration parameters preferably takes the general form of pattern-matching filters, which specify frame data patterns and event conditions on which to update specific counters and also to capture data. Additional pattern-matching filters may be used to define the portions of captured frames that have to be retained in internal buffers. The use of such pattern-matching filters for frame analysis is well-known in the prior art and will not be described further herein.

Execution of the test procedure configured at step 113 is accomplished at step 114 by protocol test generation and processing unit 20, and may consist of generating traffic for stimulating the device or system under test 15 as well as recording its responses.

During the execution of the test procedure, each test unit 10 may perform continuous, real-time traffic monitoring, and record a comprehensive set of events, statistics and traffic data within its on-board memory. The types of records maintained in the memory of each test unit 10 preferably include:

(a) event records, such as clear-channel assessment, acquisition, coding violations, etc.;

(b) captured wireless data frames (in whole or in part), selected according to filters defined during configuration step 113;

(c) interface-dependent parameters associated with captured wireless data frames, such as total length, data rate, received signal strength, signal quality, etc.;

(d) error parameters associated with captured wireless data frames, such as CRC errors, illegal frame lengths, illegal frame types, and illegal frame field values;

(e) predefined statistics counters that accumulate counts of different events, including received and transmitted data and control frames of various types, received and transmitted octets, frame size histograms, frames received from specific addresses, etc.; and (f) user-defined auxiliary statistics counters that accumulate counts of the number of frames that match set of user-configured filter parameters, as well as the number of frame octets corresponding to those frames.

The following additional types of records may advantageously be maintained in the memory:

(a) predefined min/max variables that record various extrema pertaining to the transmitted and received traffic streams, including the maximum medium busy time, the minimum IFS, the maximum and minimum packet lengths, etc.;

(b) user-defined auxiliary min/max variables that record the minimum and maximum time interval between any two types of user-selectable packet filters; and (c) tables that record wireless data frame fields, including addresses, that are associated with the received traffic, with each table being preferably of a predefined maximum size, and new entries added to a table preferably overwriting the oldest entries when the table becomes full.

Each record may be associated with a timestamp that indicates when it was created or updated. The timestamp preferably has a precision of 1 nanosecond and an accuracy no worse than that of the master clock 57 within each test unit 10.

The information gathered during the execution of the test procedure at step 114 may advantageously be placed into a database maintained by CPU 30 in protocol test generation and processing unit 20 for retrieval by the user via GUI 100 on the central controller 14. The user is preferably provided with a single view of the databases in all of the active test units, to simplify the process of retrieving and analyzing data. The test units 10, 11, 12, 13 therefore comprise a single distributed database of monitored information that can be queried at will.

During execution of the test procedure at step 114, the protocol generation and test processing unit 20 in each test unit 10 may further generate wireless data traffic for device and system testing as well as network performance analysis. Such traffic may include three categories: specific frame sequences used to test device functions and protocol compliance, continuous traffic generated to measure system throughput, and illegal data generated to test the robustness of the device or system under test 15.

Compliance testing of device or system under test 15 to a particular wireless data communication standard is preferably performed by creating specific command sequences on GUI 100 and executing them on test units 10, 11, 12, 13 in order to generate traffic to exercise various aspects of the protocol. Examples of such protocol compliance test sequences for the Wireless LAN protocol include association and authentication handshakes, RTS/CTS handshakes, interframe spacing tolerance sequences.

FIG. 9 depicts an example of a test sequence as displayed on test sequence control window 104 of GUI 100. This sequence illustrates the process of generating a WLAN frame transfer protocol compliance check, including the steps of waiting for a Request To Send (RTS) frame, sending a Clear To Send (CTS) frame, waiting for a Data frame to arrive within the specified interval of 10 microseconds, sending an Acknowledge (ACK) frame in response, and then repeating the process 100 times to ensure that the device under test 15 is compliant to this portion of the WLAN protocol. It is clear from FIG. 9 that each test unit 10 is capable of conditioning the execution of test sequences based on responses from the device under test; for instance, the sequence illustrated causes the test unit 10 to wait for a specific frame to be transmitted by the device under test 15 before proceeding with the rest of the sequence, which allows complex protocol handshakes to be properly supported.

Throughput measurements on device or system under test 15 may further be supported by test units 10, 11, 12, 13. Throughput measurements require the test units to continuously generate back-to-back frames with the minimum interframe spacing specified by the wireless data communications protocol, while supporting all of the handshaking requirements of the protocol. In the case of WLANs, such handshaking requirements may include association, authentication, RTS/CTS exchanges, Data/ACK exchanges, and so on. The throughput measurements supported by the wireless data communication protocol test system include: sustained traffic throughput, burst traffic throughput, traffic focusing (multiple endstations to one access point or endstation) throughput, database capacity tests (addresses, association IDs, etc.), frame size handling and interframe gap tolerance.

Interference tests on device or system under test 15 may further be supported by test unit 10, 11, 12, 13. Such interference tests include:

(a) Collision interference. Test units 10, 11, 12, 13 may monitor transmissions from device or system under test 15 and deliberately collide at specified locations within specified frames transmitted by the device, in order to permit the measurement of the device's ability to perform retransmissions. In addition, the test units 10, 11, 12, 13 may advantageously be set up to collide with each other, to allow the collision detection capabilities of the device under test 15 to be verified. Collisions are preferably performed by simply transmitting a random bit pattern via RF interface unit 21 while the device under test 15 is still transmitting a data packet.

(b) Continuous wave interference. Test units 10, 11, 12, 13 may be configured to generate a continuous unmodulated carrier at the center frequency of any given wireless data communications channel, in order to simulate the effect of a tone jammer on the operation of device under test 15.

(c) Spread-spectrum interference. Test units 10, 11, 12, 13 may be configured to output a continuous pseudorandom bitstream, not organized as valid wireless data frames, and confined to a specific channel. This measures the ability of the device under test 15 to cope with signal-to-noise ratio impairments.

(d) Adjacent-BSS interference. A subset of test units may be configured to simulate a distant BSS operating within the same channel as a local BSS of which the device under test 15 is a part. Simulation of a distant BSS is performed by configuring the subset of test units to operate at reduced power and larger delay relative to the remainder of the test units, thereby emulating the attenuation and path delay experienced in the actual environment.

The synchronization logic 35, together with master clock and clock offset control 57 in each test unit 10 may be advantageously used to permit the rigid alignment of sequences among test units 10, 11, 12, 13, so that any test unit, e.g. 10, generates traffic at precisely determined times with respect to all other test units, e.g. 11, 12, 13. This permits the user to simulate specific traffic patterns, perform throughput and latency tests, and simulate interference in a highly deterministic and repeatable manner. As an example, two or more such synchronized test units 10, 11 may be configured to perform closely aligned back-to-back transactions with one device under test 15 in order to measure performance in a traffic focusing scenario.

Reporting of test results to the user via GUI 100 for review and analysis may take place continuously during the test execution, or may take place after the test execution has completed. Reported results include statistics counters, transmitted and received frames, and the real-time status of each test unit 10.

Each test unit 10 should preferably report a user-selectable set of statistics counters to the controller for display in the statistics counter window 105 of GUI 100. These statistics counters include counts of received and transmitted frames, counts of transmitted multicast frames, counts of failed transmits, counts of retried transmits, counts of duplicate frames received, counts of control frames received and transmitted, counts of errored frames received, counts of bytes received and transmitted, and counts of fragmented frames received and transmitted. The protocol test generation and processing unit 20 preferably ensures that the counters are coherent, i.e., the values being displayed are all measured at the same instant in time. GUI 100 may advantageously support a display mode wherein counters from multiple test units 10, 11, 12, 13 are displayed simultaneously, in a side-by-side organization to permit the user to make quick comparisons of counter values from the different test units. In place of a side-by-side display, GUI 100 may further support a spreadsheet form of counter display that permits the user to perform arithmetic operations using one or more counter values from one or more test units, the results of which are displayed and updated concurrently with the counters themselves. This form of display is very useful for making throughput, packet loss and error rate measurements.

Each test unit 10 should preferably transfer the frames received by RF interface unit 21 and filtered by protocol test generation and processing unit 20 to the GUI 100 on the central controller 14 under user command during or after the test execution, for display on test setup and results window 103. GUI 100 may advantageously support a further display mode wherein frames from multiple test units 10, 11, 12, 13 are displayed simultaneously, in a side-by-side organization to permit quick comparisons.

Each test unit 10 should preferably present its operational status continuously to the central controller 14 for display in the test unit status window 107 of GUI 100. The status information displayed includes: the health of the test unit (whether running, idle or faulty); the current location of the test unit in three dimensions; the current transmit power setting; key fields of the last frame received by the test unit (addresses, received power, etc.); and the group to which the test unit belongs.

The wireless data communication protocol test system may further support the following special functions to aid the user in setting up and monitoring tests, and handling the location-sensitive nature of wireless data communication networks:

(a) 3-D display window 106 in GUI 100. This window is used to display all of the test units in their 3-dimensional spatial locations relative to the central controller 14, and may also be used to display the computed location of the device under test 15. The spatial locations are obtained from location processor 27. The 3-D window 106 may be coupled into the remainder of the underlying control program running on central controller 14 and GUI 100, such that test units can be selected by clicking on them in the window. In addition, the system may support the automatic specification of artificial delays and attenuation factors introduced into sequences run by different test units 10, 11, 12, 13 (thereby simulating the effect of locating test units at different positions within the environment) by permitting the user to drag the icons associated with the test units to different locations within the 3-D window. This in turn causes the configuration of RF interface unit 21 in each of the test units 10, 11, 12, 13 to be updated automatically such that the transmitted power and receiver thresholds are modified to reflect the effect of the different channel attenuation, and the master clock and clock offset control 57 is adjusted to reflect the effect of the different path delay.

(b) Test unit selection and grouping window 102 in GUI 100. This window allows the user to group test units 10, 11, 12, 13 into one or more subsets, assign names to each group, and then manipulate all of the test units in each group as a unit. For instance, it is advantageous to start and stop all of the test units in a group simultaneously, thereby repeatably emulating the effect of stations at multiple points in a wireless network beginning their transmissions simultaneously. The grouping of test units may also be used to apply traffic generation and monitoring parameters to all of the test units in a group, if the group is first selected prior to modifying the parameters, thereby simplifying the task of setting up the parameters for a group.

It is apparent that the teachings of the present invention enable the protocol testing of wireless data communication devices or networks having location sensitive characteristics to be performed in a simpler and more deterministic manner, with a higher degree of reliability and a reduced burden upon the user. It is further apparent that the location-sensitive characteristics of the wireless data communication device or network may be accounted for and tested during the protocol testing process. It is further apparent that the present invention provides for the simulation of the location-dependent characteristics of a wireless data communications network during protocol testing of wireless data communication devices or systems.

The present invention may also be modified to provide the following embodiments:

(a) Inclusion of record/replay functions. With reference to FIG. 2, RF interface unit 21 is capable of continuously receiving wireless data communication signals from antenna 22, and passing these signals to protocol test generation and processing unit 20 for storage in test and result storage memory 25. Further, RF interface unit 21 is capable of continuously accepting bit data from protocol test generation and processing unit 20 for transmission as wireless data communication signals from antenna 22. These functions can be advantageously coupled to permit recording and future replay of wireless data communication signals, such that a sequence of signals may be initially recorded in permanent or semi-permanent form in test and result storage 25 and later replayed via RF interface unit 21 to regenerate the same sequence of signals exactly.

Such record/replay functions are very useful for diagnostic purposes, wherein a signal or packet sequence evoking a defect in a device or system under test may be captured and recorded, and later replayed as many times as necessary to re-create the defect and permit it to be fixed. In addition, such record/replay functions are useful for capturing a sequence of signals at one location (for example, a user environment) and later reproducing the same sequence of signals at another environment (for example, a laboratory). The ability of the present invention to emulate the location-sensitive characteristics of an environment is of significant benefit in this case.

(b) Provision of a multi-protocol RF interface unit 21 in test unit 10. The present invention may be extended to support the testing of multiple wireless data communication protocols without requiring multiple types of test units by modifying RF interface unit 21 to support these different protocols. For example, it is possible to support the IEEE 802.11b and IEEE 802.11a, both WLAN data communication protocols, by adapting RF interface unit 21 to support the physical layers specific to both IEEE 802.11b and IEEE 802.11a; as the underlying MAC protocol is identical for both, it is possible to simultaneously test devices conforming to either or both protocols by using only one set of test units 10, 11, 12, 13.

(c) Provision of a channel simulator 130 in front of RF interface unit 21 in test unit 10. A channel simulator is a device, well known in the prior art, that emulates the physical characteristics of a wireless transmission channel, including the various types of impairments that may be present in the channel, such as attenuation, phase shifts, fading, multipath effects, noise and interference. With reference to FIG. 2, the placement of a channel simulator 140, as alternatively shown with dashed lines, between RF interface 21 and antenna 22 would permit the physical aspects of the wireless channel to be exactly emulated, rather than the approximate emulation possible by adjusting the delay, output power and receiver threshold of RF interface 21. This, in turn, would allow more accurate emulation of the location-sensitive properties of a wireless data communication environment to be performed.

Figure 10:
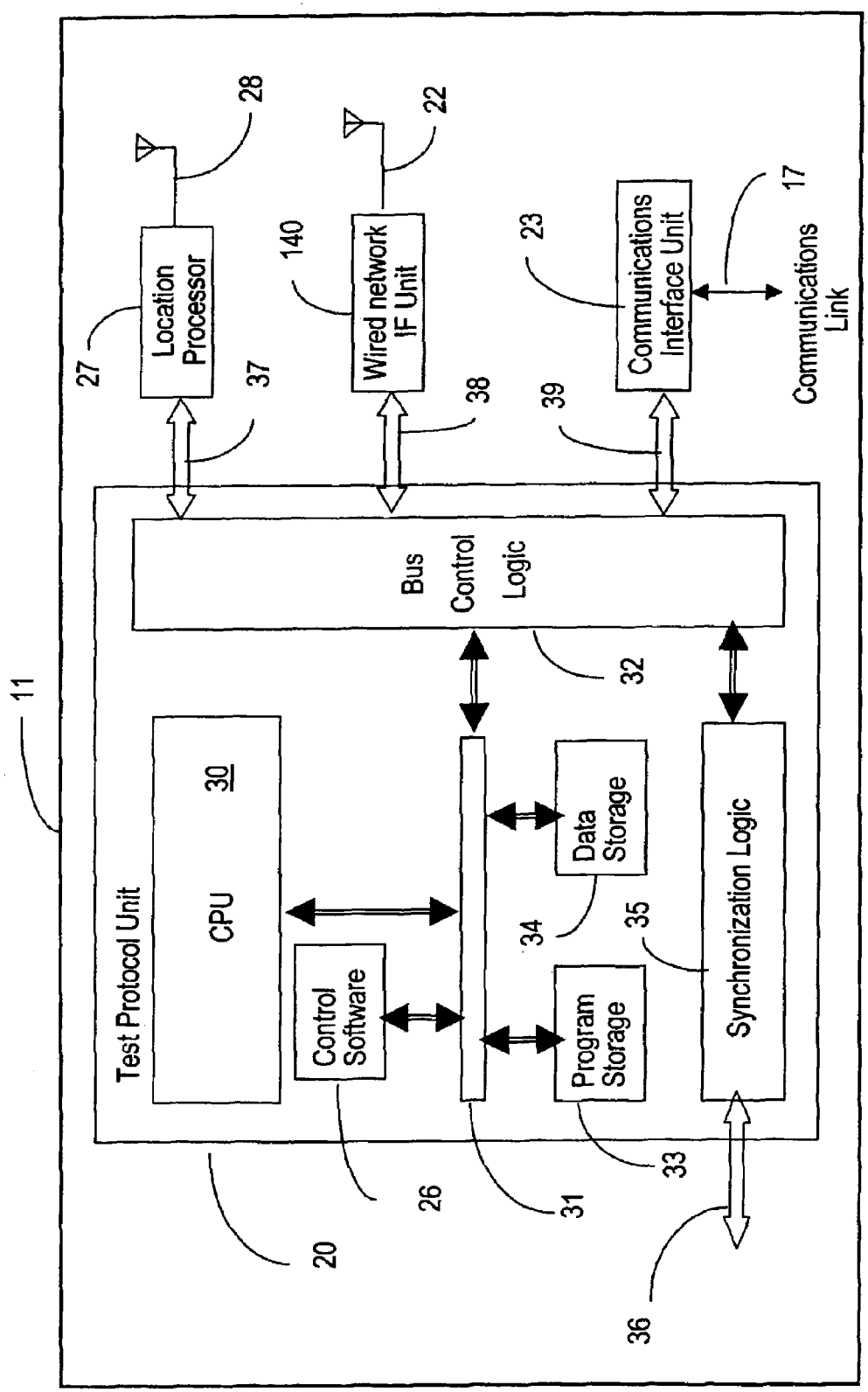
FIG. 10 is a schematic block diagram showing the details of a single test unit with a wired network interface.

(d) Provision of a wired network interface unit. Most wireless data communication networks incorporate a wired portion as well; for instance, the access points of a WLAN are linked together using a wired network (typically Ethernet), and the basestations of a cellular network are connected to the cellular switching system via wired transmission trunks. With reference to FIG. 10, the present invention may be extended to include the testing of the wired portion of the wireless data communication networks by providing a wired network interface unit 140 in test unit 11, in place of RF interface unit 21 in test unit 10 of FIG. 2. This would enable simultaneous testing of the wired and wireless portions of a wireless data communications network; the test units with standard RF interface units 21 would be positioned and configured to generate wireless test data signals, and the test units, such as test unit 11 with wired network interfaces shown in FIG. 10, would be attached to the wired network portions of the data communications network. Communications unit 23 depicted in FIG. 5A may be utilized with the wired network interface unit 140 in a test unit to support an Ethernet test interface, for example.

Accordingly, while this invention has been described with reference to illustrative embodiments, this description is not intended to be construed in a limiting sense. Various modifications of the illustrative embodiments, as well as other embodiments of this invention, will be apparent to persons skilled in the art upon reference to this description.

What is claimed is:

1. A test unit for testing operation and measuring performance of wireless data communication systems and equipment, comprising:
   a protocol test unit for generating test stimulus data, executing a sequence of test steps selected for testing operation and measuring performance of said wireless data communication systems, and processing test result data;
   a location processor, operatively coupled to said protocol test unit, for generating spatial location data providing the location of said protocol test unit relative to a preset point; and
   a first interface unit, operatively coupled to said protocol test unit, for converting said test stimulus data to a first format specific to said object under test and for converting said test result data to a second format specific to said protocol test unit.

2. The test unit as in claim 1, wherein said first interface unit further includes means for forwarding converted test result data to said protocol test unit, and wherein said protocol test unit having means for storing said converted test result data as previously recorded test result data.

3. The test unit as claimed in claim 2, wherein said first interface unit includes means for regenerating said previously recorded test result data to produce additional test stimulus data based on said sequence of test steps selected and said previously recorded test result data.

4. The test unit as claimed in claim 1, further comprising a second interface unit for converting said test result data from said second format to a third format specific to a remote central controller and for converting monitoring and control data received from said remote central controller into said second format.

5. The test unit as claimed in claim 4, wherein said protocol test unit comprises:
   means for storing said sequence of test steps and said test result data;
   a central processing unit for controlling operation of said protocol test unit according to said monitoring and control data; and
   means for operatively connecting said central processing unit with said location processor, said first interface unit and said second interface unit.

6. The test unit as claimed in claim 5, wherein said means for operatively connecting comprises:
   a bus control logic for controlling internal data transfer between said central processing unit, said means for storing, said location processor, said first interface unit and said second interface unit; and
   a data bus for enabling data transfer between said central processing unit, said means for storing, and said bus control logic.

7. The test unit as claimed in claim 4, wherein said test protocol unit further comprises a synchronization unit for providing a clock reference for said first interface unit.

8. The test unit as claimed in claim 7, wherein said synchronization unit further provides a synchronization input port and a synchronization output port for connection to corresponding synchronization output and input ports on additional test units.

9. The test unit as claimed in claim 5, wherein said means for storing comprises both non-volatile memory for storing said sequence of test steps and a volatile memory for storing said test result data.

10. The test unit as claimed in claim 1, wherein said first interface unit comprises:
    an antenna for generating a wireless test stimulus signal and capturing a wireless test result signal over a wireless link;
    Radio Frequency (RF) front-end means for formatting a serial sequence of test stimulus data into said wireless test stimulus signal and transmitting said wireless test stimulus signal on said wireless link, and also for receiving said wireless test result signal and formatting same into a serial sequence of test result data; and
    means for converting said test stimulus data into said serial sequence of test stimulus data and converting said serial sequence of test result data into said serial sequence of test result data.

11. The test unit as claimed in claim 10, wherein said RF front-end means further comprises means for controlling the transmit power level of said wireless test stimulus signal in accordance with said sequence of test steps executed by said protocol test unit.

12. The test unit as claimed in claim 10, wherein said RF front-end means further comprises means for controlling the receiver detection threshold of said wireless test results signal in accordance with said sequence of test steps executed by said protocol test unit.

13. The test unit as claimed in claim 10, wherein said RF front-end means further comprises means for controlling the transmit power level of said wireless test stimulus signal in accordance with said sequence of test steps executed by said protocol test unit.

14. The test unit as claimed in claim 10, wherein said first interface means comprises a channel simulator, operatively coupled between said antenna and said RF front-end means, for emulating physical characteristics of said wireless link.

15. The test unit as claimed in claim 10, wherein said means for converting comprises:
    a serial to parallel converter for converting n consecutive bits of said sequence of test result data into an n-bit receive word;
    means for formatting said receive words into said test results data and separating said test stimulus data into transmit words;
    a parallel to serial converter for converting each said transmit word into n consecutive bits; and
    an RF interface for transmitting said test results data to said protocol test unit, and for receiving said test stimulus data from said protocol test unit.

16. The test unit as claimed in claim 15, wherein said means for formatting comprises:
    a master clock for providing an accurate time indication;
    means for establishing the beginning and the end of each said receive word based on said time indication; and
    means for determining the beginning and the end of each transmit word based on said time indication.

17. The test unit as claimed in claim 16, further comprising means for adding and subtracting an adjustable offset delay to said accurate time indication in accordance with said sequence of test steps executed by said protocol test unit.

18. The test unit as claimed in claim 1, wherein said location processor comprises:
    a location antenna for receiving a location signal according to a specified wireless protocol;
    a location front-end unit for processing said location signal in conformity with said wireless protocol;
    a baseband processor for converting said location signal into said spatial location data; and
    a location interface to said protocol test unit.

19. The test unit as claimed in claim 18, wherein said specified wireless protocol is GPS, and wherein said spatial location signal is a satellite navigation signal.

20. The test unit as claimed in claim 4, wherein said third format used by said second interface unit is Ethernet.

21. The test unit as claimed in claim 20, wherein said second interface unit comprises:
   an Ethernet medium access control (MAC) logic unit for performing Ethernet frame processing and MAC functions on said monitoring and control data and said test results data;
   an Ethernet physical layer device (PHY) logic unit for implementing Ethernet physical layer functions required to interface said communication interface unit with said central controller; and
   a communication interface to said protocol test unit.

22. The test unit as claimed in claim 4, wherein said third format used by said second interface unit is a radio data link.

23. The test unit as claimed in claim 22, wherein said second interface unit comprises:
   an antenna coupled to a transmit/receive switch unit, for transmitting said test results data and for receiving said monitoring and control data over said radio data link;
   a serial transmitter/receiver for modulating said test results data and respectively detecting said monitoring and control data in a serial format;
   a bi-directional UHF serializer-deserializer processor for converting the format of said test results data and said monitoring and control data between said serial format required over said radio data link and a parallel format required by said protocol test unit;
   a clock generator for generating a carrier frequency signal for modulating/said receiver and said transmitter; and
   a communication interface to said protocol test unit.

24. A test system for testing operation and measuring performance of wireless data communication systems and equipment, comprising:
   n test units, each test unit for selectively testing a specific parameter and data protocol pertinent to an object under test, where n is an integer n∈[1, N];
   a location processor on each said test units for determining the location of each said test unit relative to a pre-set point;
   a central controller for monitoring, controlling and coordinating operation of said test units and collecting test results data associated with said respective spatial location data; and
   a user interface for enabling selection of test sequences, configuration of traffic generation and of test parameters.

25. The test system as claimed in claim 24, wherein said n test units are collectively adapted at their physical layer such that said n test units are capable of further testing, in parallel, at least one additional object under test.

26. The test system as claimed in claim 24, wherein each said test unit operates as one of a wireless LAN (WLAN) access point, a WLAN endstation, and a traffic monitor for said object under test.

27. The test system as claimed in claim 24, wherein any of said test units is connected to said central controller over an Ethernet link.

28. The test system as claimed in claim 24, wherein any of said test units is connected to said object under test over a wireless link.

29. A method of testing operation and measuring performance of wireless data communication systems and equipment, comprising:

a) providing n test units in the proximity of an object under test and connecting said test units to a central controller, where n in an integer n∈[1, N];
   b) initializing a connection between said test units and said central controller;
   c) configuring, at each said test unit, traffic generation, a test sequence, and a set of reporting parameters according to said test sequence;
   d) operatively controlling said test units for executing said test sequence;
   e) collecting test result data at said test units and associating said test result data with a respective test unit; and
   f) organizing, reviewing and analyzing said test result data.

30. The method as claimed in claim 29, wherein said steps b) through e) are initiated from said central controller.

31. The method as claimed in claim 29, wherein said step b) comprises:
   b1) identifying said n test units connected to said central controller and configuring a set of test units, within said n test units, for executing said test sequence;
   b2) time-synchronizing said set of test units by exchanging timing signals between said set of test units to bring a clock reference generated by said set of test units into synchronism with a master clock of said n test units; and
   b3) determining the spatial position of each of said set of test units in relation to said central controller.

32. The method as claimed in claim 31, wherein said step b3) is implemented using the Global Positioning System (GPS) to determine the absolute three-dimensional spatial co-ordinates of each respective test unit.

33. The method as claimed in claim 32, further comprising improving location accuracy for said test units by providing differential GPS (DGPS) corrections to said spatial position.

34. The method as claimed in claim 31, wherein step b) further comprises providing firmware upgrades to said test units from said central controller.

35. The method as claimed in claim 29, wherein said step c) comprises:
   c1) initializing a first interface unit for establishing a wireless link between each said test unit and said object under test for enabling execution of said test sequence;
   c2) configuring traffic patterns and monitoring parameters to be used during execution of said test sequence; and
   c3) defining reporting options for test results to be sent back to said central controller.

36. The method as claimed in claim 35, wherein said step c1) comprises writing operational parameters for said wireless link into a plurality of registers of said first interface unit, including a data rate, a preamble length, a respective scrambler seeds, antenna selection controls, tone generation, and receiver automatic gain control (AGC) control.

37. The method as claimed in claim 35, wherein step c1) comprises initializing said first interface unit in each said test unit with a relative offset delay, such that said test sequence executed on any one of said test units is adjustably offset in time relative to said test sequence executed on any other of said test units.

38. The method as claimed in claim 37, wherein said relative offset delay is used to emulate the effect of increasing or decreasing the relative distance between said test units and said object under test.

39. The method as claimed in claim 35, wherein said step c2) comprises configuring traffic monitoring parameters and configuring traffic generation parameters for determining the nature of traffic to be transmitted by the test units.

40. The method as claimed in claim 39, wherein said traffic monitoring parameters include error filters, frame capture filters, event filters and counter update controls.

41. The method as claimed in claim 39, wherein said traffic generation parameters include frame data values, data payload patterns, error injection parameters, traffic stream parameters and test sequence scripts.

42. The method as claimed in claim 36, wherein said traffic generation parameters include transmit power level values.

43. The method as claimed in claim 42, wherein said transmit power level values are adjusted to emulate the effect of adjusting a relative distance between said test units and said object under test.

44. The method as claimed in claim 42, wherein said transmit power level values are adjusted to emulate an effect of adjusting relative attenuation properties of said wireless link established between said test units and said object under test.

45. The method as claimed in claim 39, wherein said traffic monitoring parameters include receiver detection threshold values.

46. The method as claimed in claim 45, wherein said receiver detection threshold values are adjusted to emulate an effect of adjusting a relative distance between said test units and said object under test.

47. The method as claimed in claim 46, wherein said receiver detection threshold values are adjusted to emulate an effect of adjusting relative attenuation properties of said wireless link established between said test units and said object under test.

48. The method as claimed in claim 39, wherein said step c3) includes providing pattern-matching filters for defining a type of statistics of interest for said test sequence, types of frames captured and reported during said test sequence, and fields within said captured types of frames that are stored.

49. The method as claimed in claim 29, wherein said step d) comprises, at each said test unit,
  d1) generating traffic for stimulating said object under test;
  d2) monitoring the traffic between said object under test and said test unit in real-time; and
  d3) recording, at said respective test unit, test responses received from said object under test.

50. The method as claimed in claim 49, wherein said step d1) comprises generating traffic by processing said test responses recorded during said step d3) at an earlier time for a given instance of said test unit.

51. The method as claimed in claim 49, wherein said step d1) comprises generating wireless data traffic including specific frame sequences used to test operation and protocol compliance of said object under test, continuously generating traffic to measure a system throughput, and generating illegal data to test a level of robustness of said object under test.

52. The method as claimed in claim 49, wherein said step d3) comprises real-time capturing and recording of: events, wireless data frames selected according to filters defined during step c), interface-dependent parameters associated with said captured wireless data frames, error parameters associated with said captured wireless data frames.

53. The method as claimed in claim 52, wherein said step d3) comprises further real-time capturing and recording of: predefined minimum and maximum variables for determining various extremes pertaining to the transmitted and received traffic streams, user-defined auxiliary minimum and maximum variables that record a minimum and maximum time interval between any two types of user-selectable packet filters, and tables that record wireless data frame fields, including addresses, that are associated with said received traffic.

54. The method as claimed in claim 49, wherein said step d3) comprises predefining statistics counters for capturing and accumulating counts of different events, counts a number of frames matching a set of user-configured filter parameters, and counts of a number of frame octets corresponding to said matching number frames.

55. The method as claimed in claim 29, wherein said test result data are associated with a timestamp for indicating modification of said test result data.

56. A test system for testing operation and measuring performance of wireless data communication systems having both a wireless network portion and a wired network portion, comprising:
  n test units, each test unit for selectively testing a specific parameter and data protocol pertinent to an object under test in said wireless data communication systems, where n is an integer $n \in [1, N]$;
  a location processor on each said test units for determining the location of each said test unit relative to a pre-set point;
  a central controller for monitoring, controlling and coordinating operation of said test units and collecting test results data associated with said respective spatial location data; and
  a user interface for enabling selection of test sequences, configuration of traffic generation and of test parameters;
  wherein at least one of said n test units includes a wireless network interface unit for testing a wireless object in said wireless network portion, and
  wherein at least one of said n test units includes a wired network interface unit for testing a wired object in said wireless network portion.

* * * * *